United States Patent [19]
Peterson et al.

[11] Patent Number: 6,128,929
[45] Date of Patent: Oct. 10, 2000

[54] MULTI-COMPONENT FIBERIZING DISK

[75] Inventors: Michael Dean Peterson, Parker; Stephen Edward Gross, Littleton, both of Colo.

[73] Assignee: Johns Manville International, Inc., Denver, Colo.

[21] Appl. No.: 09/109,146

[22] Filed: Jul. 2, 1998

[51] Int. Cl.[7] .............................. X03B 37/04; F27B 7/00
[52] U.S. Cl. .............................. 65/521; 65/470; 65/516; 65/515; 425/8; 425/131.5; 425/192 S
[58] Field of Search .............................. 65/469, 470, 515, 65/516, 521; 425/8, 131.5, 192 S; 264/8

[56] References Cited

U.S. PATENT DOCUMENTS

| | | |
|---|---|---|
| 372,242 | 10/1887 | Stevens . |
| 2,529,962 | 11/1950 | Powell . |
| 3,372,014 | 3/1968 | Garrison . |
| 3,542,533 | 11/1970 | Hesse . |
| 3,928,009 | 12/1975 | Perry . |
| 5,118,332 | 6/1992 | Hinze . |
| 5,447,423 | 9/1995 | Fuisz et al. . |
| 5,582,841 | 12/1996 | Watton et al. . |
| 5,595,766 | 1/1997 | Houpt et al. . |
| 5,618,328 | 4/1997 | Lin et al. . |
| 5,851,454 | 12/1998 | Rutkowski et al. . |

*Primary Examiner*—Stanley S. Silverman
*Assistant Examiner*—Michael P. Colaianni
*Attorney, Agent, or Firm*—John D. Lister

[57] ABSTRACT

A multi-component fiberizing disk for fiberizing a molten fiberizable material in a rotary fiberization process includes: an annular sidewall having fiberizing holes therein through which a molten fiberizable material passes to fiberize the molten fiberizable material; an upper annular flange; and a base having an annular outer peripheral edge. The annular sidewall, the upper annular flange and the base are made from at least two separate components and, preferably, from three separate components. The separate components are secured to together as the fiberizing disk by fasteners, such as bolt and nut fasteners, that permits the separate components of the fiberizing disk to be disassembled after service. The different components can be made of different metal alloys and a distribution manifold can be incorporated into the fiberizing disk for distributing the molten fiberizable material(s) within the fiberizing disk and to make bi-component fibers.

20 Claims, 4 Drawing Sheets

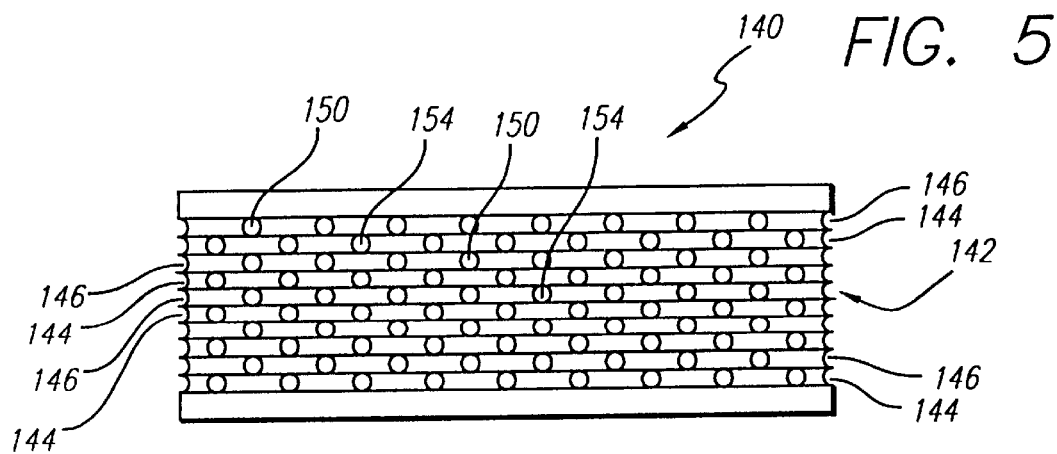
FIG. 5
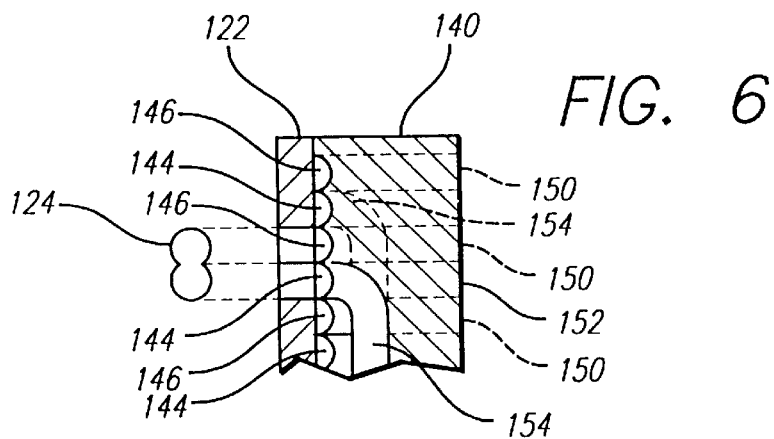
FIG. 6
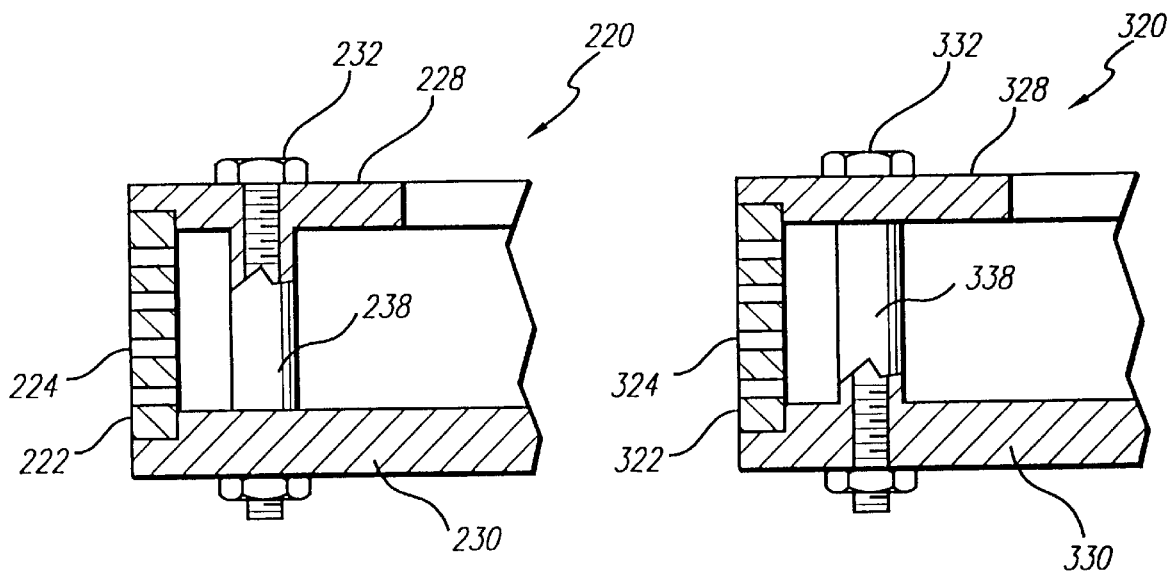
FIG. 7
FIG. 8

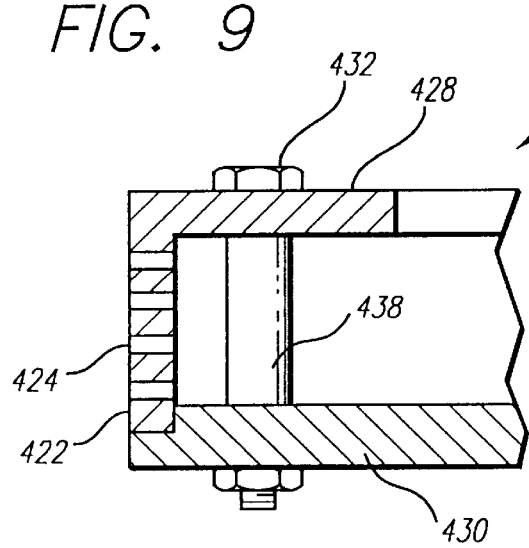
FIG. 9
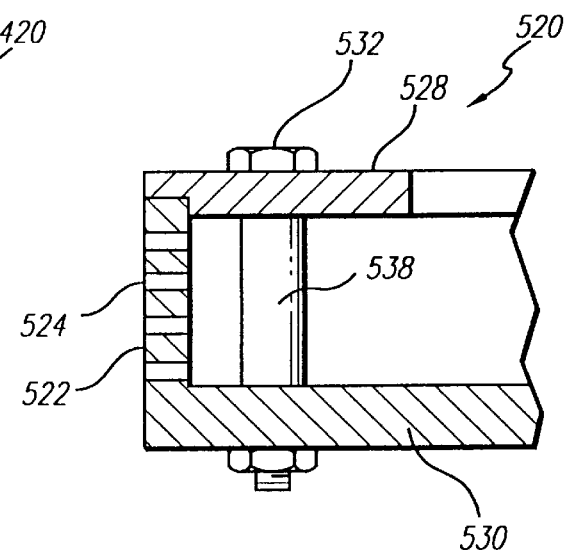
FIG. 10
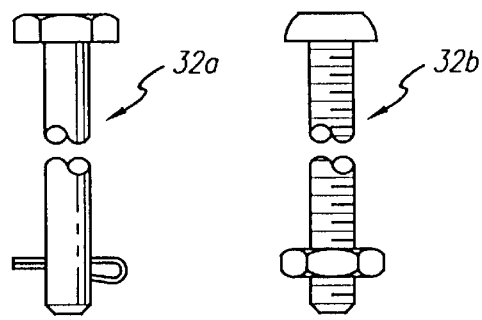
FIG. 11
FIG. 12
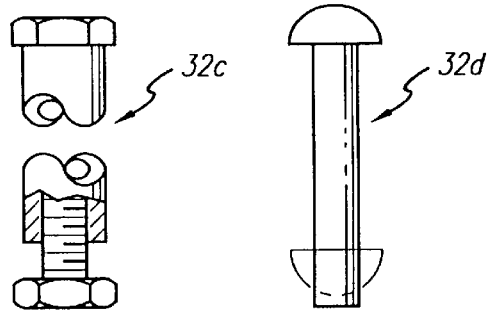
FIG. 13
FIG. 14
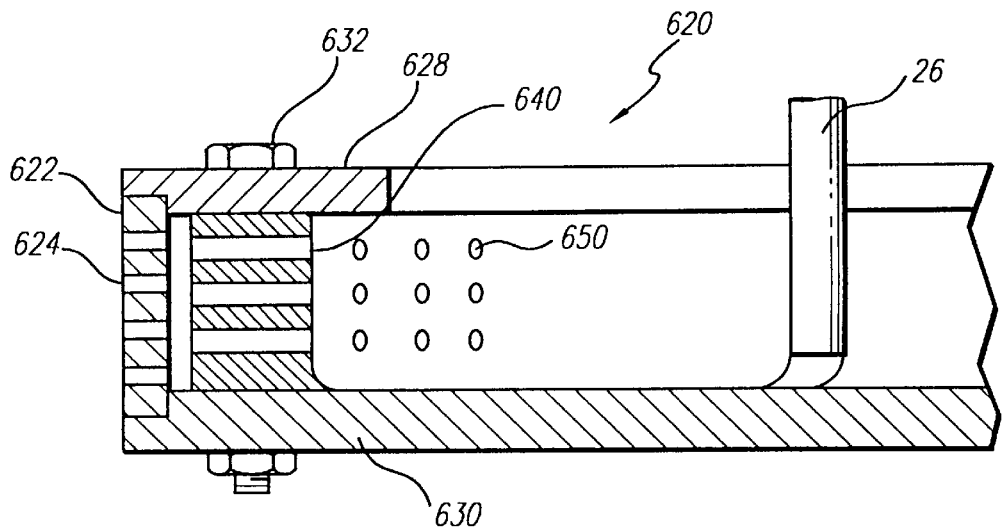
FIG. 15

MULTI-COMPONENT FIBERIZING DISK

BACKGROUND OF THE INVENTION

The present invention relates to fiberizing disks used in rotary fiberization processes to fiberize molten fiberizable materials, such as glass, and, in particular, to multi-component fiberizing disks with reusable components that can be disassembled after service and reassembled with replacement components to form new multi-component fiberizing disks. The multi-components fiberizing disks of the present invention permit one or more of the separate components of the fiberizing disks to be made of different metal alloys to reduce costs and possibly extend the service life of the multi-component fiberizing disks.

Various fibrous products, such as fibrous insulation products, are made from fibers produced by rotary fiberization processes wherein a fiberizable material is liquefied by heat to make it molten and delivered to the interior of a rapidly rotating fiberizing disk which typically rotates at several thousand revolutions per minute. There the molten fiberizable material is fiberized by passing the molten fiberizable material through a plurality, typically hundreds or thousands, of relatively small diameter fiberizing holes in a peripheral annular sidewall of the fiberizing disk to form fine molten streams of the fiberizable material which are cooled to form fibers of various selected diameters. The fibers thus formed are then collected. The term "fiberizable materials" includes materials which can be fiberized by the processes outlined in this paragraph, such as but not limited to glass, polymeric, mineral and other organic and inorganic materials.

When forming fibers from materials, such as glass and other fiberizable materials, which are highly corrosive and must be heated to high temperatures to liquefy the materials and make the materials fiberizable, several problems are presented. As the molten corrosive fiberizable materials pass through the small diameter fiberizing holes to be fiberized, the fiberizing holes are corroded and enlarged over the service life of the fiberizing disk. Since fiber quality is a function of the hole size of the fiberizing holes, once the size of the fiberizing holes has been increased to a certain diameter, the quality of the fibers produced with the fiberizing disk becomes unacceptable for the product being produced and the fiberizing disk must be taken out of service.

The fiberizing disks, used to fiberize these highly corrosive, high melting point materials such as glass, have typically been made from high strength, corrosion resistant alloys, such as nickel, cobalt and carbide based alloys, by casting the fiberizing disks. While these alloys perform satisfactorily, there has been a desired to extend the service life of these fiberizing disks by using even higher strength more corrosion resistant alloys to form the fiberizing disks. Thus, to extend the service life of the fiberizing disks, the fiberizing disks have been made of oxide dispersion strengthened metals wherein the metals matrix includes a dispersion of small hard oxide particles (dispersoids). However, the use of oxide dispersion strengthened metals to lengthen the service life of the fiberizing disks also presents problems. These alloys are considerably more expensive than the nickel, cobalt or carbide based alloys otherwise used to form the fiberizing disks and where composite fiberizing disks have been made to reduce the costs of the fiberizing disks, as in U.S. Pat. No. 5,118,332, the components have been tenaciously joined by transient liquid phase bonding thereby requiring each of the fiberizing disks to be processed as a whole to recover the spent alloy after the service life of the fiberizing disk.

In a typical manufacturing operation, numerous fiberizing disks are concurrently at a different stage of an operating cycle: a number of the fiberizing disks are being cast; a number of fiberizing disks are being machined; a number of fiberizing disks are having fiberizing holes formed therein; a number of fiberizing disks are being transported to the manufacturing operation; a number of fiberizing disks are in inventory at the manufacturing operation; a number of fiberizing disks are in use; a number of used fiberizing disks are in inventory to be processed to recover spent alloy; a number of fiberizing disks are being transported to the alloy recovery location; a number of fiberizing disks are being cleaned for alloy recovery; and a number of fiberizing disks are being processed to recover spent alloy. Thus, it can be seen that there is a great deal of expensive alloy currently required to maintain a rotary fiberization production line operating continuously with an ample supply of fiberizing disks and there has been a need to reduce the amount of the more expensive alloy required to extend the service life of the fiberizing disks without losing the benefits obtained from using the more expensive alloys, e.g. the oxide dispersion strengthened metals.

SUMMARY OF THE INVENTION

The multi-component fiberizing disk of the present invention provides a solution to the above problems through a multi-component fiberizing disk formed of components which can be assembled and disassembled. The individual components can be made from different alloys that specifically meet the physical characteristics required for the particular component and the use of more expensive alloys can be limited to those components where the additional strength and corrosion resistance of the more expensive alloys is required, such as in the peripheral annular sidewall of the fiberizing disk. Due to a possible reduction in the load bearing requirements for the peripheral, annular sidewall in the multi-component fiberizing disk of the present invention, the present invention may also enable the use of thinner sidewalls or enable lower strength, higher corrosion resistant alloys to be used for the peripheral, annular sidewall of the multi-component fiberizing disk, than would be practical with an integral fiberizing disk, to extend the service life of the fiberizing disk.

The multi-component fiberizing disk of the present invention includes: an annular sidewall having fiberizing holes therein through which a molten fiberizable material passes to fiberize the molten fiberizable material; an upper annular flange or retainer plate; and a base or central hub having an annular outer peripheral edge and a central opening or other means for securing a spindle or other means for rotating the multi-component fiberizing disk. The annular sidewall, the upper annular flange or retainer plate and the base or central hub are made from at least two separate components and, preferably, from three separate components. The separate components are secured together to form the fiberizing disk by fasteners, such as bolt and nut fasteners, that permit the separate components of the fiberizing disk to be disassembled after service.

A fiberizing disk is normally taken out of service when the fiberizing holes in the peripheral annular sidewall of the fiberizing disk have been enlarged through corrosion to a point where the fibers produced by the fiberizing disk are no longer acceptable for the product being produced. Typically, the upper annular flange and the base of the fiberizing disk are still in satisfactory condition when the fiberizing disk must be taken out of service. With the multi-component fiberizing disk of the present invention, the fiberizing disk can be disassembled after service; the upper annular flange or retainer plate and/or the base or central hub can be cleaned (e.g. in a salt bath to remove extraneous glass residue); and a new peripheral annular sidewall can be substituted for the sidewall with the corroded fiberizing holes by securing the new sidewall to the upper annular flange or retainer plate and base or central hub of the multi-component fiberizing disk. The peripheral annular sidewall of the fiberizing disk represents as little as 15% of the weight of the fiberizing disk. Since the upper annular flange and base can be reused and only the peripheral annular sidewall must be processed for recovery of the alloy and reformed into a new sidewall, the use of the multi-component fiberizing disk of the present invention in a manufacturing process may result in a considerable cost reduction by reducing the amount of alloy being recovered and made into new fiberizing disks.

In addition to enabling the different components of the fiberizing disk to be made of different metal alloys and certain of the components to be reused, the multi-component fiberizing disk of the present invention can include various types of internal distribution manifolds for distributing one or more molten fiberizable materials within the fiberizing disk (e.g. to reduce the temperature gradient across the sidewall of the fiberizing disk by directing hot molten glass to the normally cooler lower internal peripheral edge of the disk) and to make bi-component fibers. Since the distribution manifolds, preferably, are separate components that are joined to the other components by the fastening means, fiberizing disks with the desired type of internal distribution manifold for a particular product can be easily assembled at the manufacturing plant.

BRIEF DESCRIPTION OF THE DRAWINGS

FIG. 5 is a schematic elevation view of the distribution manifold of the multi-component fiberizing disk of FIGS. 3 and 4.

FIG. 6 is a partial vertical schematic cross section through the annular sidewall and the distribution manifold of the multi-component fiberizing disk of FIGS. 3–5 showing the distribution channels and ports in the distribution manifold and a preferred fiberizing hole configuration in the annular sidewall.

FIG. 7 is a partial vertical schematic cross section through a multi-component fiberizing disk of the present invention having an upper annular flange with integral fastener sleeves.

FIG. 8 is a partial vertical schematic cross section through a multi-component fiberizing disk of the present invention having a base with integral fastener sleeves.

FIG. 9 is a partial vertical schematic cross section through a multi-component fiberizing disk of the present invention wherein the annular sidewall and the upper annular flange of the fiberizing disk are integral.

FIG. 10 is a partial vertical schematic cross section through a multi-component fiberizing disk of the present invention wherein the annular sidewall and the base of the fiberizing disk are integral.

FIGS. 11–14 show examples of fasteners which can be used to secure the components of the multi-component fiberizing disk of the present invention together.

FIG. 15 is a partial elevation schematic cross section through a multi-component fiberizing disk of the present invention which includes a distribution manifold for distributing a molten fiberizable material within the fiberizing disk.

DESCRIPTION OF THE PREFERRED EMBODIMENTS

Figure 1:
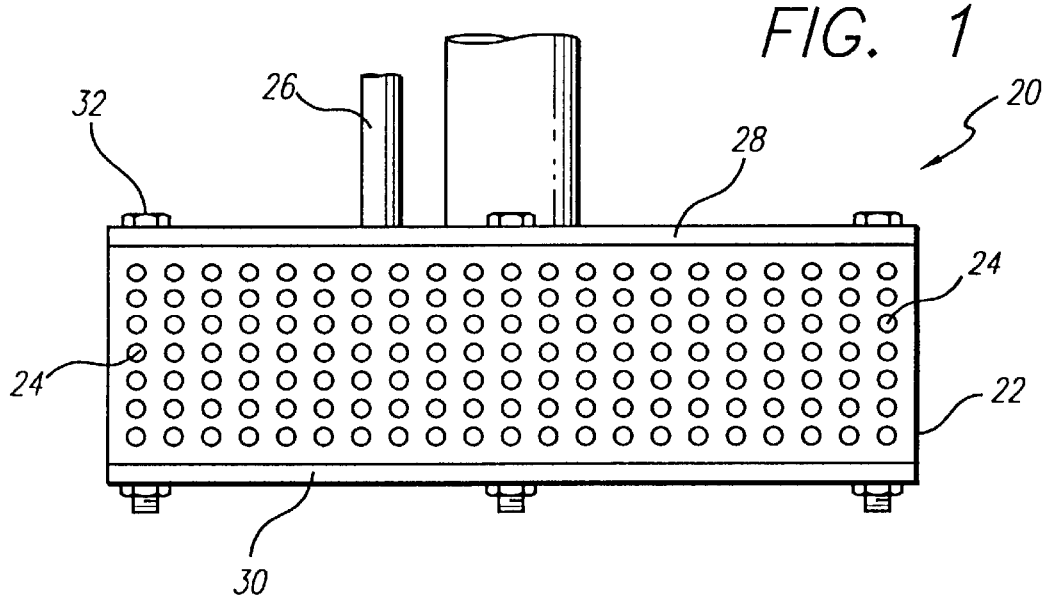
FIG. 1 is a schematic elevation view of a multi-component fiberizing disk of the present invention.
Figure 2:
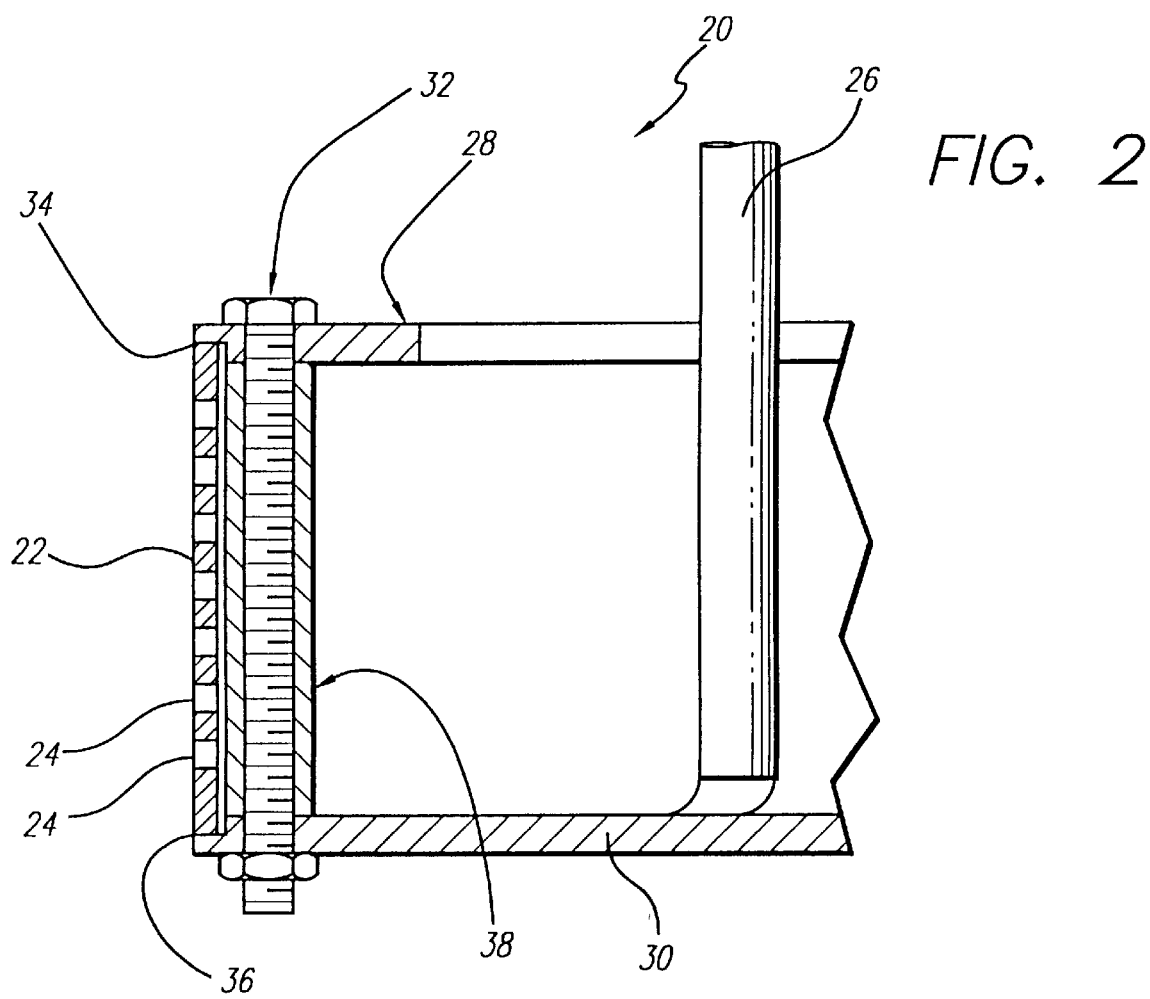
FIG. 2 is a partial vertical schematic cross section through the multi-component fiberizing disk of FIG. 1.
Figure 3:
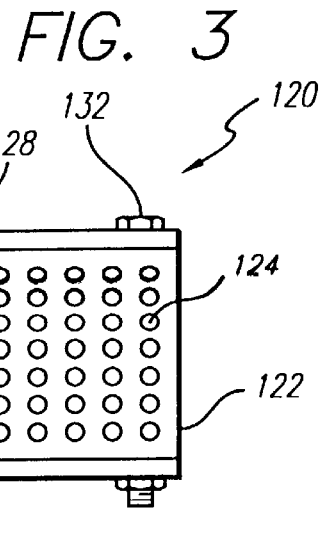
FIG. 3 is a schematic elevation view of a multi-component fiberizing disk of the present invention which includes a distribution manifold for distributing the molten fiberizable materials being fiberized within the fiberizing disk.

As shown schematically in FIGS. 1 and 2, the multi-component fiberizing disk 20 includes: an annular sidewall 22 having fiberizing holes 24 therein through which a molten fiberizable material 26 passes to fiberize the molten fiberizable material; an upper annular flange or retainer plate 28; and a base or central hub 30 having an annular outer peripheral edge and a central opening or securement means to which a spindle or other means for rotating the multi-component fiberizing disk is secured. The annular sidewall 22 extends vertically or substantially vertically and the upper annular flange or retainer plate 28 and the base or central hub 30 extend generally horizontally and inward from the annular sidewall 22. The annular sidewall 22, the upper annular flange or retainer plate 28 and the base or central hub 30 are three separate components which are secured together to form the fiberizing disk 20 by fasteners 32, such as bolt and nut fasteners, that permit the separate components of the fiberizing disk to be disassembled after service so that at least some of the components can be cleaned and reassembled with one or more new components to form another fiberizing disk.

The annular sidewall 22, the upper annular flange 28 and the base 30 of the multi-component fiberizing disk 20 may be made of various metal alloys, preferably high temperature resistant, corrosion resistant alloys, including alloys currently used to form fiberizing disks, such as but not limited to, nickel, cobalt or carbide based alloys and oxide dispersion strengthened metals or alloys. As discussed above in the Summary of the Invention, the components may each be made of a different alloy specifically suited to the application. Typically, the annular sidewall 22 would be made of a higher strength, more corrosion resistant alloy than the upper annular flange 28 or the base 30. While such alloys are generally more expensive, the added strength and corrosion resistance offered by these alloys may substantially extend the service life of the fiberizing disk which is normally determined by the ability of the fiberizing holes to resist corrosion which enlarges the holes and degrades the fiber produced and the ability of the sidewall to maintain its shape and not bow out causing a disk failure.

Typically, the annular sidewall 22 of the multi-component fiberizing disk 20 is a ring which has been cast or rolled, machined, and drilled, to form fiberizing holes 24 in the sidewall, by conventional fabrication practices used in the industry. There are hundreds and normally thousands of fiberizing holes 24 arranged in horizontally extending, parallel rows encircling the annular sidewall 22. The initial diameter of the fiberizing holes drilled into the sidewall varies and is determined at least in part by the diameter of the fibers to be produced with the fiberizing disk.

As shown in FIG. 2, the outer, annular peripheral edges of the upper annular flange or retaining plate 28 and the base or central hub 30 are each provided with grooves 34 and 36 for receiving the upper and lower edges of the annular sidewall 22. The grooves 34 and 36 not only retain the sidewall 22 in place, once the multi-component fiberizing disk 20 is assembled, but the mating surfaces of the sidewall 22 and the upper annular flange 28 and the base 30 also function to form labyrinth seals between the sidewall 22 and the upper annular flange 28 and the base 30. While, as shown in FIG. 2, the grooves 34 and 36 and the mating surfaces of the upper and lower edges of the sidewall 22 are each defined by surfaces oriented at right angles to each other, the configurations of the grooves 34 and 36 and the mating surfaces of the upper and lower edges of the sidewall 22, may have other mating configurations that retain the sidewall in place once the fiberizing disk is assembled and provide a seal between the sidewall 22 and the upper annular flange 28 and the base 30.

Normally, the components of the multi-component fiberizing disk 20 are held together by fasteners spaced apart about every three inches around the circumference of the fiberizing disk. Accordingly, fiberizing disks 20 ranging from eight to twenty four inches in diameter will typically require from eight to twenty four fasteners. While a bolt and nut fastener 32 is shown securing the sidewall 22, the upper annular flange 28 and the base 30 together in FIGS. 1 and 2, other fasteners that permit the multi-component fiberizing disk to be disassembled, such as but not limited to the fasteners shown in FIGS. 11–14, can also be used to secure the components of the multi-component fiberizing disk 20 together. FIG. 11 shows a fastener 32a with a head at one end of the shank and a cotter or cotter pin, which passes through an opening in the shank, adjacent the opposite end of the shank. FIG. 12 shows a fastener 32b with a rounded head at one end of a threaded shank and a nut adjacent the opposite end of the shank. FIG. 13 shows a fastener 32c wherein a second bolt is threaded into the tubular threaded end of a first bolt. While not preferred since it may make disassembly of the components somewhat more difficult, FIG. 13 shows a fastener 32d which is a rivet with a rounded head at one end of the shank and an opposite end adapted to be deformed as shown in phantom line.

Preferably, sleeves or tubular spacers 38 are provided to set the spacing between the lower surface of the upper annular flange 28 and the upper surface of the base 30 and to enclose the fasteners 32 so that once the fiberizing disk is taken out of service any fiberizable material that may harden within the disk will not interfere with the removal of the fasteners 32 from the multi-component fiberizing disk 20. In the assembled multi-component fiberizing disk 20, the sleeves or tubular spacers 38 extend from the lower surface of the upper annular flange 28 to the upper surface of the base 30 and have an internal diameter large enough to permit the fasteners to pass through the sleeves.

FIGS. 3–6 show a multi-component fiberizing disk 120 of the present invention for forming bi-component fibers. The multi-component fiberizing disk includes an annular sidewall 122 having fiberizing holes 124 therein through which molten fiberizable materials 26 and 26a pass to fiberize the molten fiberizable materials; an upper annular flange or retainer plate 128; and a base or central hub 130 having an annular outer peripheral edge and a central opening or securement means to which a spindle or other means for rotating the multi-component fiberizing disk is secured. The annular sidewall 122 extends vertically or substantially vertically and the upper annular flange or retainer plate 128 and the base or central hub 130 extend generally horizontally and inward from the annular sidewall 122. In addition, the multi-component fiberizing disk 120 includes a distribution manifold 140. The annular sidewall 122, the upper annular flange or retainer plate 128, the base or central hub 130, and the distribution manifold 140 are four separate components which are secured together to form the fiberizing disk 120 by fasteners 132, such as bolt and nut fasteners and the fasteners shown in FIGS. 11–14, that permit the separate components of the fiberizing disk to be disassembled after service so that at least some of the components can be cleaned and reassembled with one or more new components to form another fiberizing disk.

As with the multi-component fiberizing disk 20, the annular sidewall 122, the upper annular flange 128, the base 130, and the distribution manifold 140 of the multi-component fiberizing disk 120 may be made of various metal alloys, preferably high temperature resistant, corrosion resistant alloys, including alloys currently used to form fiberizing disks, such as but not limited to, nickel, cobalt or carbide based alloys and oxide dispersion strengthened metals or alloys. Furthermore, each or some of the components may be made of a different alloy specifically suited to the application with a higher strength, more corrosion resistant alloy typically being used to form the annular sidewall 122.

Typically, the annular sidewall 122 of the multi-component fiberizing disk 120 is a ring which has been cast or rolled, machined, and drilled, to form fiberizing holes 124 in the sidewall, by conventional fabrication practices used in the industry. There are hundreds and normally thousands of fiberizing holes 124 arranged in horizontally extending, parallel rows encircling the annular sidewall 122. The initial diameter of the fiberizing holes drilled into the sidewall varies and is determined at least in part by the diameter of the fibers to be produced with the fiberizing disk. The fiberizing holes 124 can have various cross sectional configurations, such as but not limited to round, oval and slotted configurations. However, FIG. 6 shows a preferred configuration of the fiberizing holes 124 for forming bi-component fibers which is a generally "8" shaped or "hourglass" shaped configuration formed by two overlapping drilled holes.

Figure 4:
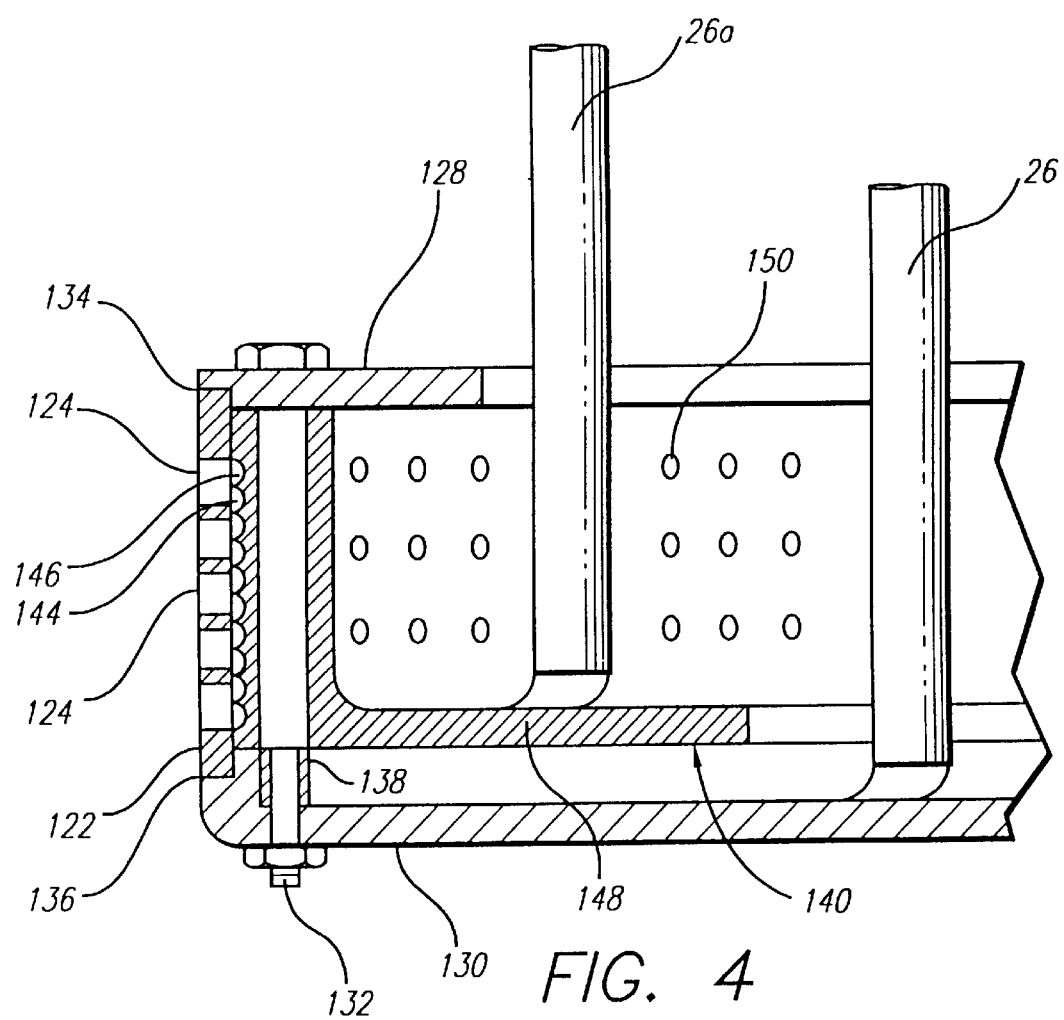
FIG. 4 is a partial vertical schematic cross section through the multi-component fiberizing disk of FIG. 3.

As shown in FIG. 4, the outer, annular peripheral edges of the upper annular flange or retaining plate 128 and the base or central hub 130 are each provided with grooves 134 and 136 for receiving the upper and lower edges of the annular sidewall 122. The grooves 134 and 136 not only retain the sidewall 122 in place, once the multi-component fiberizing disk 120 is assembled, but the mating surfaces of the sidewall 122 and the upper annular flange 128 and the base 130 also function to form labyrinth seals between the sidewall 122 and the upper annular flange 128 and the base 130. While, as shown in FIG. 2, the grooves 134 and 136 and the mating surfaces of the upper and lower edges of the sidewall 122 are each defined by surfaces oriented at right angles to each other, the configurations of the grooves 134 and 136 and the mating surfaces of the upper and lower edges of the sidewall 122, may have other mating configurations that retain the sidewall in place once the fiberizing disk is assembled and provide a seal between the sidewall 122 and the upper annular flange 128 and the base 130.

As shown in FIG. 4, the distribution manifold 140 is located within the annular sidewall 122 and is raised above the base 130 by sleeves 138 which may be integral with the distribution manifold or separate components. As shown in FIGS. 4, 5 and 6, the outer surface 142 of the annular, distribution manifold 140 has a plurality of alternating, horizontally extending, parallel grooves 144 and 146 encircling the distribution manifold. The distribution manifold 140 includes a lower inner annular flange 148 for receiving the second stream of molten fiberizable material 26a and a plurality of radially extending ports 150 which extend from the inner annular vertical surface 152 of the distribution manifold 140 to the grooves 146 in the outer surface of the distribution manifold. The ports 150 distribute the molten fiberizable material 26a from the inner annular flange 148 of the distribution manifold to the grooves 146 in the outer surface of the distribution manifold. The distribution manifold is also provided with a plurality of risers 154 which extend from the lower surface of the distribution manifold to the grooves 144 in the outer surface of the distribution manifold. The risers distribute the molten fiberizable material 26 from the base 130 of the multi-component disk to the grooves 144 in the outer surface of the distribution manifold. While as shown in FIG. 5, the ports 150 are offset from the risers 154, other patterns may be used for supplying the molten fiberizable materials to the grooves 144 and 146. The hydraulics within the rapidly rotating fiberizing disk 120 easily cause the molten fiberizable materials 26 and 26a to flow through the risers 154 and ports 150 and into the grooves 144 and 146 respectively.

As best shown in FIG. 6, the outer surface 142 of the distribution manifold 140 mates with the inner surface of the annular sidewall 122 and the grooves 144 and 146 are aligned with the lower and the upper portions of the fiberizing holes 124 respectively. This causes the molten fiberizable material 26 flowing from the lower annular groove 144 to pass through the lower portions of the fiberizing holes 124 and the molten fiberizable material 26a flowing from the upper annular grooves 146 to pass through the upper portions of the fiberizing holes 124 with the molten fiberizable materials interfacing where the upper and lower portions of the fiberizing holes 124 overlap to form bi-component fibers. The alternating grooves 144 and 146, together with the "8" shaped or "hourglass" shaped fiberizing holes 124 which overlap or bridge the alternating grooves 144 and 146, permit the use of many more fiberizing holes 124 in the annular sidewall 122 of the fiberizing disk than other disk designs, known to applicants, for producing bi-component fibers.

Normally, the components of the multi-component fiberizing disk 120 are held together by fasteners spaced apart about every three inches around the circumference of the fiberizing disk. Accordingly, fiberizing disks 120 ranging from eight to twenty four inches in diameter will typically require about eight to twenty four fasteners. While a bolt and nut fastener 132 is shown securing the sidewall 122, the upper annular flange 128, the base 130 and the distribution manifold together in FIGS. 3 and 4, other fasteners that permit the multi-component fiberizing disk to be disassembled, such as but not limited to the fasteners shown in FIGS. 11–14 and described above, can also be used to secure the components of the multi-component fiberizing disk 120 together.

The sleeves or tubular spacers 138 and the distribution manifold enclose the fasteners 132 so that once the fiberizing disk is taken out of service any fiberizable material that may harden within the disk will not interfere with the removal of the fasteners 132 from the multi-component fiberizing disk 120. The sleeves or tubular spacers 138 may be separate components or integral with the distribution manifold 140. In the assembled multi-component fiberizing disk 120, the sleeves or tubular spacers 138 extend from the lower surface of the distribution manifold to the upper surface of the base 130; have an internal diameter large enough to permit the fasteners to pass through the sleeves; and together with the distribution manifold set the spacing between the upper annular flange 128 and the base 130.

FIG. 7 shows a multi-component fiberizing disk 220 of the present invention which includes: an annular sidewall 222 having fiberizing holes 224 therein through which a molten fiberizable material passes to fiberize the molten fiberizable material; an upper annular flange or retainer plate 228; and a base or central hub 230 having an annular outer peripheral edge and a central opening or securement means to which a spindle or other means for rotating the multi-component fiberizing disk is secured. The annular sidewall 222 extends vertically or substantially vertically and the upper annular flange or retainer plate 228 and the base or central hub 230 extend generally horizontally and inward from the annular sidewall 222. The annular sidewall 222, the upper annular flange or retainer plate 228 and the base or central hub 230 are three separate components which are secured together to form the fiberizing disk 220 by fasteners 232, such as bolt and nut fasteners and the fasteners shown in FIGS. 11–14, that permit the separate components of the fiberizing disk to be disassembled after service so that at least some of the components can be cleaned and reassembled with one or more new components to form another fiberizing disk. The multi-component fiberizing disk 220 is the same as the multi-component fiberizing disk 20, with one exception, the sleeves 238 through which the fastener 232 pass are integral with the upper annular flange or retaining plate 228.

FIG. 8 shows a multi-component fiberizing disk 320 of the present invention which includes: an annular sidewall 322 having fiberizing holes 324 therein through which a molten fiberizable material passes to fiberize the molten fiberizable material; an upper annular flange or retainer plate 328; and a base or central hub 330 having an annular outer peripheral edge and a central opening or securement means to which a spindle or other means for rotating the multi-component fiberizing disk is secured. The annular sidewall 322 extends vertically or substantially vertically and the upper annular flange or retainer plate 328 and the base or central hub 330 extend generally horizontally and inward from the annular sidewall 322. The annular sidewall 322, the upper annular flange or retainer plate 328 and the base or central hub 330 are three separate components which are secured together to form the fiberizing disk 320 by fasteners 332, such as bolt and nut fasteners and the fasteners shown in FIGS. 11–14, that permit the separate components of the fiberizing disk to be disassembled after service so that at least some of the components can be cleaned and reassembled with one or more new components to form another fiberizing disk. The multi-component fiberizing disk 320 is the same as the multi-component fiberizing disk 20, with one exception, the sleeves 338 through which the fasteners 332 pass are integral with the base or central hub 330.

FIG. 9 shows a multi-component fiberizing disk 420 of the present invention which includes: an annular sidewall 422 having fiberizing holes 424 therein through which a molten fiberizable material passes to fiberize the molten fiberizable material; an upper annular flange or retainer plate 428; and a base or central hub 430 having an annular outer peripheral edge and a central opening or securement means to which a spindle or other means for rotating the multi-component fiberizing disk is secured. The annular sidewall 422 extends vertically or substantially vertically and the upper annular flange or retainer plate 428 and the base or central hub 430 extend generally horizontally and inward from the annular sidewall 422. The annular sidewall 422 and the upper annular flange or retainer plate 428 are one integral component and the base 430 is a separate component. These two components are secured together to form the fiberizing disk 420 by fasteners 432, such as bolt and nut fasteners and the fasteners shown in FIGS. 11–14, that permit the separate components of the fiberizing disk to be disassembled after service so that at least some of the components can be cleaned and reassembled with one or more new components to form another fiberizing disk. Other than having the annular sidewall 422 and the upper annular flange or retaining plate 428 as one integral component, the multi-component fiberizing disk 420 is the same as the multi-component fiberizing disk 20. The sleeves 438 through which the fasteners 432 pass may be separate components or integral with either the upper annular flange or retainer plate 428 or the base or central hub 430.

FIG. 10 shows a multi-component fiberizing disk 520 of the present invention which includes: an annular sidewall 522 having fiberizing holes 524 therein through which a molten fiberizable material passes to fiberize the molten fiberizable material; an upper annular flange or retainer plate 528; and a base or central hub 530 having an annular outer peripheral edge and a central opening or securement means to which a spindle or other means for rotating the multi-component fiberizing disk is secured. The annular sidewall 522 extends vertically or substantially vertically and the upper annular flange or retainer plate 528 and the base or central hub 530 extend generally horizontally and inward from the annular sidewall 522. The annular sidewall 522 and the base or central hub 530 are one integral component and the upper annular flange or retainer 528 is a separate component. These two components are secured together to form the fiberizing disk 520 by fasteners 532, such as bolt and nut fasteners and the fasteners shown in FIGS. 11–14, that permit the separate components of the fiberizing disk to be disassembled after service so that at least some of the components can be cleaned and reassembled with one or more new components to form another fiberizing disk. Other than having the annular sidewall 522 and the base or central hub 530 as one integral component, the multi-component fiberizing disk 520 is the same as the multi-component fiberizing disk 20. The sleeves 538 through which the fasteners 532 pass may be separate components or integral with either the upper annular flange or retainer plate 528 or the base or central hub 530.

FIG. 15 shows a multi-component fiberizing disk 620 of the present invention which includes an annular sidewall 622 having fiberizing holes 624 therein through which a molten fiberizable material 26 passes to fiberize the molten fiberizable material; an upper annular flange or retainer plate 628; and a base or central hub 630 having an annular outer peripheral edge and a central opening or securement means to which a spindle or other means for rotating the multi-component fiberizing disk is secured. The annular sidewall 622 extends vertically or substantially vertically and the upper annular flange or retainer plate 628 and the base or central hub 630 extend generally horizontally and inward from the annular sidewall 622. In addition, the multi-component fiberizing disk 620 includes a distribution manifold 640. The annular sidewall 622, the upper annular flange or retainer plate 628, the base or central hub 630, and the distribution manifold 640 are four separate components which are secured together to form the fiberizing disk 620 by fasteners 632, such as bolt and nut fasteners and the fasteners shown in FIGS. 11–14, that permit the separate components of the fiberizing disk to be disassembled after service so that at least some of the components can be cleaned and reassembled with one or more new components to form another fiberizing disk. Other than the distribution manifold 640, the multi-component fiberizing disk 620 is the same as the multi-component fiberizing disk 120.

The distribution manifold 640 shown has radial ports 650 for distributing the molten fiberizable material 26 onto the inner surface of the annular sidewall 622 and is one of many configurations which could be used to distribute or deliver the molten fiberizable material 26 to the annular sidewall 622 for fiberization through the fiberizing holes 624. The fasteners 632 pass through sleeves in the distribution manifold to secure the components of the multi-component fiberizing disk 620 together. While the distribution manifold 640, as shown in a separate component, the distribution manifold 640 can integral with either the upper annular flange or retainer plate 628 or the base or central hub 630.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A multi-component fiberizing disk for fiberizing a molten fiberizable material in a rotary fiberization process comprising:

an outer annular sidewall component having fiberizing holes therein through which a molten fiberizable material passes to fiberize the fiberizable material;

an upper annular flange component having an outer annular peripheral edge portion;

a disk shaped base component having an upper surface for receiving and delivering molten fiberizable material to the outer annular sidewall for fiberization; the disk shaped base component having an outer annular peripheral edge portion;

the outer annular sidewall component extending generally perpendicular to the upper annular flange component and the disk shaped base component and from the outer annular peripheral edge portion of the upper annular flange component to the outer annular peripheral edge portion of the disk shaped base component; at least two of the outer annular sidewall, the upper annular flange and the disk shaped base components being separable from each other and held together by fastening means to form a fiberizing disk; and the fastening means securing the separable components together as the fiberizing disk and permitting the separable components to be disassembled after service; the fastening means being a plurality of removable fasteners that extend between and secure together the upper annular flange component and the disk shaped base component; and each of the fasteners being enclosed within sleeve means passing from an under surface of the upper annular flange component to the upper surface of the disk shaped base component to prevent the molten fiberizable material being fiberized from hardening about the fastener when the fiberizing disk is taken out of service thereby enabling the fastener to be easily removed from the fiberizing disk for disassembly.

2. The multi-component fiberizing disk according to claim 1, wherein: the outer annular sidewall component and the upper annular flange component are integral and the disk shaped base component is a separate detachable component.

3. The multi-component fiberizing disk according to claim 2, wherein: the removable fasteners are selected from a group of fasteners consisting of bolt and nut fasteners; bolt and cotter or cotter pin fasteners; and rivet fasteners.

4. The multi-component fiberizing disk according to claim 2, wherein: the outer annular sidewall component and the upper annular flange component are made of a first metal alloy and the disk shaped base component is made of a second metal alloy.

5. The multi-component fiberizing disk according to claim 1, wherein: the outer annular sidewall component and the disk shaped base component are integral and the upper annular flange component is a separate detachable component.

6. The multi-component fiberizing disk according to claim 5, wherein; the removable fasteners are selected from a group of fasteners consisting of bolt and nut fasteners; bolt and cotter or cotter pin fasteners; and rivet fasteners.

7. The multi-component fiberizing disk according to claim 5, wherein: the outer annular sidewall component and the disk shaped base component are made of a first metal alloy and the upper annular flange component is made of a second metal alloy.

8. The multi-component fiberizing disk according to claim 1, wherein: the outer annular sidewall component, the upper annular flange component and the disk shaped base component are each separate components; and the fastening means secures the three separate components together as a fiberizing disk that permits the separate components to be disassembled after service.

9. The multi-component fiberizing disk according to claim 8, wherein: the removable fasteners are selected from a group of fasteners consisting of bolt and nut fasteners; bolt and cotter or cotter pin fasteners; and rivet fasteners.

10. The multi-component fiberizing disk according to claim 8, wherein: the outer annular sidewall component is made of a first metal alloy and the upper annular flange component and the disk shaped base component are made of a second metal alloy.

11. The multi-component fiberizing disk according to claim 8, wherein: the outer annular sidewall component is made of a first metal alloy and the disk shaped base component is made of a second metal alloy.

12. The multi-component fiberizing disk according to claim 1, including: an inner annular distribution manifold means for delivering the molten fiberizable material being fiberized to the fiberizing holes in the outer annular sidewall component; the inner annular distribution manifold means be located radially inward with respect to the outer annular sidewall component; and the sleeves enclosing the fasteners being integral with the inner annular distribution manifold means.

13. The multi-component fiberizing disk according to claim 12, wherein: the distribution manifold means is a component separate from the outer annular sidewall component.

14. The multi-component fiberizing disk according to claim 12, wherein: the distribution manifold means is a component separate from the outer annular sidewall component; and the distribution manifold means is made of a first metal alloy and the outer annular sidewall component is made of a second metal alloy.

15. The multi-component fiberizing disk according to claim 1, including: an inner annular distribution manifold means for delivering two molten fiberizable materials being fiberized to the fiberizing holes to form bi-component fibers; the distribution manifold means having means elevated above an upper surface of the disk shaped base component for receiving a first molten fiberizable material and delivering the first molten fiberizable material to the fiberizing holes in the outer annular sidewall component; the distribution manifold means having a means for delivering a second molten fiberizable material delivered to the upper surface of the disk shaped base component from the base component to the fiberizing holes in the outer annular sidewall component; the inner annular distribution manifold means being located radially inward with respect to the outer annular sidewall component; and the sleeves enclosing the fasteners being integral with the inner annular distribution manifold means.

16. The multi-component fiberizing disk according to claim 15, wherein: the distribution manifold means is a component separate from the outer annular sidewall component.

17. The multi-component fiberizing disk according to claim 16, wherein: the distribution manifold means has an outer annular surface with a plurality of alternate, adjacent first and second parallel grooves therein encircling the outer annular surface; each of the first parallel grooves receiving the first molten fiberizable material; each of the second parallel grooves receiving the second molten fiberizable material; the outer annular surface of the distribution manifold means being adjacent an inner annular surface of the outer annular sidewall component; and pairs of the adjacent first and second parallel grooves each communicating with a row of fiberizing holes in the outer annular sidewall component whereby both of the molten fiberizable materials are delivered to the fiberizing holes in the row to form bi-component fibers from the molten fiberizable materials.

18. The multi-component fiberizing disk according to claim 17, wherein: the fiberizing holes are hourglass shaped.

19. The multi-component fiberizing disk according to claim 15, wherein: the removable fasteners are selected from a group of fasteners consisting of bolt and nut fasteners; bolt and cotter or cotter pin fasteners; and rivet fasteners.

20. The multi-component fiberizing disk according to claim 15, wherein: the distribution manifold means is a component separate from the outer annular sidewall component; and the distribution manifold means is made of a first metal alloy and the outer annular sidewall component is made of a second metal alloy.

* * * * *